United States Patent [19]

Breed, III et al.

[11] Patent Number: 4,461,538
[45] Date of Patent: Jul. 24, 1984

[54] ACTIVE RECEPTACLE HAVING RESILIENT SLEEVE-LIKE BUSHING

[75] Inventors: Richard A. Breed, III, South Attleboro; Henry W. Doyle, Ocean Bluff; Harold A. Roberts, North Attleboro, all of Mass.

[73] Assignee: Augat Inc., Mansfield, Mass.

[21] Appl. No.: 312,999

[22] Filed: Oct. 20, 1981

[51] Int. Cl.³ .............................................. G02B 7/26
[52] U.S. Cl. .................... 350/96.20; 250/227
[58] Field of Search ............ 350/96.17, 96.18, 96.20, 350/96.21; 250/227; 357/17, 19, 30, 74

[56] References Cited

U.S. PATENT DOCUMENTS

| 4,075,477 | 2/1978 | Hanson | 250/227 |
| 4,184,741 | 1/1980 | Hawk et al. | 350/96.20 |
| 4,186,995 | 2/1980 | Schumacher | 350/96.20 |
| 4,186,996 | 2/1980 | Bowen et al. | 350/96.20 |
| 4,222,629 | 9/1980 | Dassele et al. | 350/96.20 |
| 4,255,015 | 3/1981 | Adams et al. | 350/96.20 |

Primary Examiner—John D. Lee
Attorney, Agent, or Firm—Weingarten, Schurgin, Gagnebin & Hayes

[57] ABSTRACT

Efficient coupling of light between an active device such as a light emitting diode having a focused light output and a ferruled optical fiber is provided by a receptacle having an adapter for increasing the diameter of the ferrule to that of the active device. The active device is concentrically and resiliently mounted at the end of the adapter, with the resilient mounting including a resilient bushing to accommodate variation in the size of the can housing the active device. The resilient bushing serves to center the can on the central axis of the adapter such that when a ferruled optical fiber is inserted into the adapter the optical fiber is coaxially aligned with and spaced from the active device.

7 Claims, 4 Drawing Figures

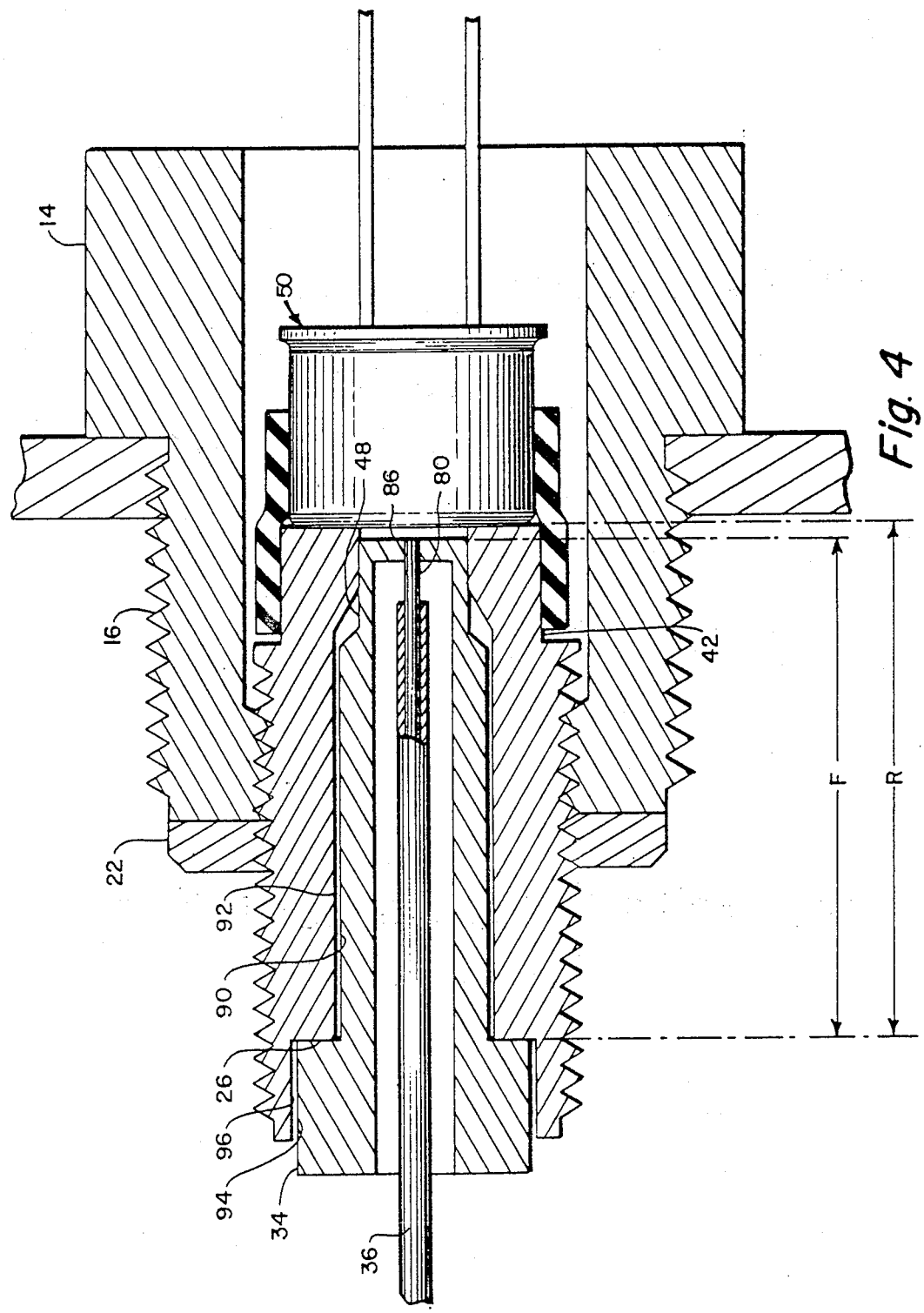

ACTIVE RECEPTACLE HAVING RESILIENT SLEEVE-LIKE BUSHING

FIELD OF THE INVENTION

This invention relates to connectors for fiber optic cables and more particularly, to apparatus for coaxially aligning an optical fiber with an active device.

BACKGROUND OF THE INVENTION

Fiber optic connectors have been utilized in the past to axially align an optical fiber with an active device such as a light emitter or light detector, in which either light is emitted from a central region of the face of the active device or light is detected at the central region. Prior art connectors for such a purpose have been termed "active receptacles" which are devices which house an active opto-electronic device, either an emitter or detector, and provide a means to connect an optical fiber to the device with an efficient transfer of light between the two. Despite the high demand for such a device, devices currently available have been inefficient or costly, mainly because of the tight tolerances necessary to couple light efficiently into an optical fiber that is only a few thousandths of an inch in diameter.

There presently exists a class of active devices which emit light, in which the output from a light emitting diode (LED) is focused to a spot at the face of the diode package. While the die producing the light output may be accurately positioned with respect to its substrate, the package, usually including a can or shell, has great variation in its outside diameter such that alignment of an optical fiber with respect to the focused spot is difficult when utilizing the outside dimension of the can or shell for fiber positioning purposes. Under ordinary circumstances, were the can or shell to be uniform in outside dimension, all that would be necessary for the active receptacle would be to provide a connector with a recess into which the active device is either press-fit or retained in a sliding fit. The optical fiber could, under such circumstances, be accurately coaxially positioned with respect to the active device through the utilization of a conventional ferrule which would be inserted into a central alignment channel communicating with the recess. However, since the cans or shells utilized to house active devices are variable in size, some other means of coaxially locating a fiber with respect to the center line of the active device is required.

By way of further background, optimal positioning of an optical fiber vis-a-vis a predetermined point on an active device has been accomplished either by the pigtailing of the fiber to the actual device or adjusting the position of the active device within the housing so as to maximize light transfer between the fiber and the active device. Optimal positioning of the light emitting diode in a connecting housing refers to adjusting the position of the light emitting diode in an oversized housing until the output from the fiber is maximum. Pigtailing refers to a practice in which the fiber is micropositioned to the emitting die of the particular light emitting diode used. Both of these approaches involve excessive labor and are time consuming.

SUMMARY OF THE INVENTION

In order to accommodate variations in the outside dimensions of cans or shells utilized to house active devices such as light emitting diodes, the subject invention includes apparatus for aligning a ferruled fiber with an active device in which the diameter of the ferrule is increased by an adapter to that of the nominal diameter of the can housing the active device, the adapter and can being coaxially aligned through the use of a resilient bushing. More specifically, the subject system is one in which an optical fiber, housed in a ferrule, is coaxially aligned with the center of the face of an active device and is accurately spaced therefrom by means of a centrally-bored adapter which increases the diameter of the ferrule so as to approach that of the active device. A resilient alignment bushing or sleeve is used which coaxially secures the active device to the distal end of the adapter which is turned-down by machining so that its outside diameter is close to that of the can or shell housing the active device. The adapter has a recessed seat which coacts with a shoulder at the distal end of the ferrule to limit the insertion of the ferrule within the central bore of the adapter to optimally space the end of the optical fiber from the active device. A connector body is provided in which the connector body coaxially receives the adapter, the active device and the resilient alignment sleeve. Note that the optical fiber must be aligned in the ferrule to a low eccentricity so as to establish the precise coaxial alignment of the optical fiber with the center of the face of the active device.

In operation, the fiber-containing ferrule is inserted into the central bore of the adapter until the shoulder at the distal end of the ferrule meets the seat of the adapter. At this point, the end of the ferrule and thus the end of the optical fiber is coaxially located within the adapter and spaced from the active device by a predetermined amount. Because the distal end of the adapter has an appropriately configured end, the adapter increases the outside diameter of the ferrule to the outside diameter of the active device while maintaining precise coaxiality of the fiber vis-a-vis the center of the active device. Since the distal end of the adapter may be machined to any predetermined diameter, many types of active devices may be accommodated. When an active device is mounted to the adapter by the resilient alignment bushing on the distal end of the adapter, the center of the face of the active device will be coaxially located with respect to the center line of the adapter, thereby coaxially locating the center of the face of the active device with the central axis of the optical fiber.

The use of the resilient alignment bushing accommodates differences between the diameters of the adapter end and the shell of the active device. As mentioned hereinbefore, manufacturers of active devices do not construct the outer can or shell of their devices to tight tolerances and the resilient alignment bushing accommodates size variations amongst active devices of the same type. Thus, batches of adapters can be machined to a predetermined size for a given type of active device or even for different devices of roughly similar outside diameter.

In summary, the active receptacle establishes extremely tight tolerances for the coaxiality of the ferrule tube vis-a-vis the end of the adapter. The resilient alignment bushing establishes the coaxiality of the active device vis-a-vis the end of the adapter, irrespective of mismatching of the diameters of these two elements. Thus, the adapter/resilient bushing combination eliminates the necessity of pigtailing or providing an oversized housing such that fiber optic connection to an active device may be accomplished without labor intensive effort.

It should be noted that the diode used does not have to be of the focusing type in order to obtain benefit from the subject system. In unfocused systems there is a greater insertion loss due to the cone of divergence of the emitted light, such that with non-focused systems less light is coupled into the core of the optical fiber. The receptacle described above aids in lowering these insertion losses due to better axial alignment of the fiber to the emitter.

BRIEF DESCRIPTION OF THE DRAWINGS

These and other features of the subject invention will be better understood in connection with the detailed description taken in conjunction with the following drawings of which:

FIG. 4 is a cross-sectional view of the active receptacle illustrating not only the mounting of an active device to the distal end of the adapter but also the mounting of the adapter within the connector body.

DETAILED DESCRIPTION OF THE DRAWINGS

Figure 1:
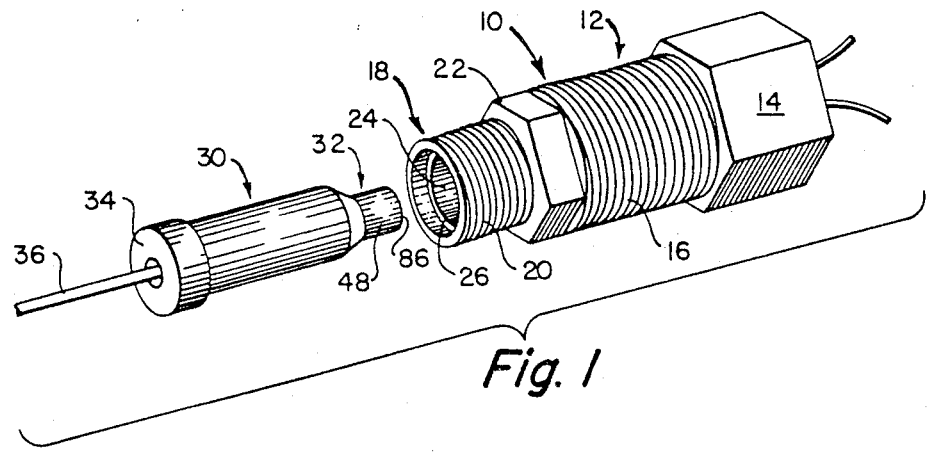
FIG. 1 is a diagramatic illustration of an active receptacle into which a fiber-containing ferrule is inserted.

Referring now to FIG. 1, a receptacle 10 housing an active device (not shown in this Figure) includes a connector body 12 which may have a hexagonal end configuration 14 and which, in one embodiment, is exteriorly threaded as illustrated at 16. The receptacle includes a removable adapter 18 which may be made from brass, and carries external threads 20, with the connector body being screwed onto the external threads of the adapter and locked in place with a locking nut 22. The adapter is provided with a central bore 24 and a recessed seat 26. A ferrule 30 having a proximal end 32 has a shoulder 34 formed at its distal end, and an optical fiber 36 is concentrically carried within the ferrule, as is common. The outer diameter of the adapter is threaded so that a cable nut 35 (FIG. 2) can be provided to hold the ferrule against the seat. The same thread allows the use of the aforementioned locking nut to secure the adapter to the connector body.

Figure 2:
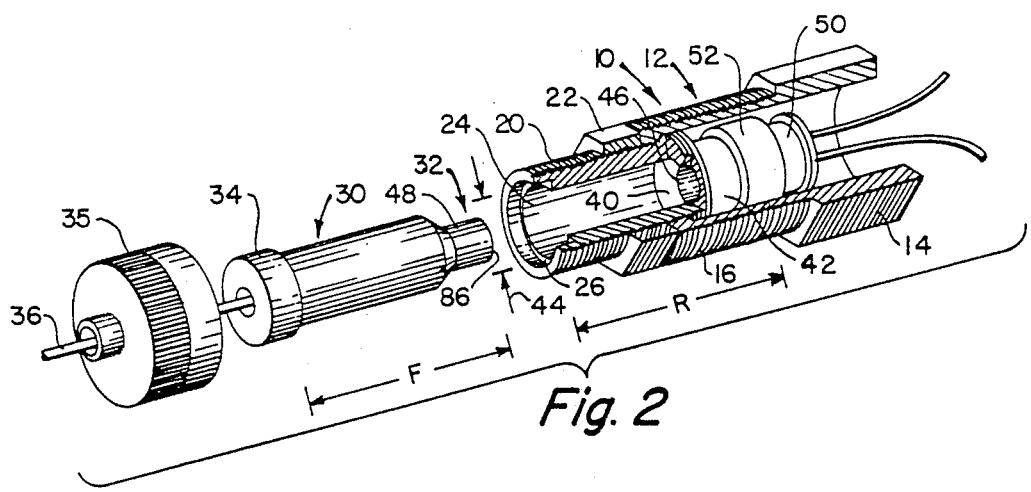
FIG. 2 is a diagramatic illustration of the arrangement of FIG. 1 showing, in partial cross-section, the internal structure of the adapter utilized in the receptacle and also the utilization of a resilient alignment bushing between an active device and the distal end of the adapter.

Referring to FIG. 2 in which like reference characters are utilized to identify like elements of FIG. 1, central bore 24 of adapter 18 is provided with a conical taper 40 at its distal end and is provided with a cylindrical end 42 which is concentric with the central axis of the adapter. In one embodiment, adapter 18 is made of brass, which facilitates the machining of end 42 to any desired outside diameter as by milling or turning. The diameter of bore 24 matches diameter 44 of ferrule 30, with the outside diameter of a necked-down portion 46 of bore 24 matching the inside diameter of a necked-down portion 48 of ferrule 30. An active device 50, which may either be a light emitting or light detecting device, is mounted to end 42 by resilient alignment bushing or sleeve 52. Resilient alignment bushing 52, in one embodiment, is made of elastomeric polyester material such as Hytrel from DuPont and may be a relatively rigid donut-shaped sturcture. After mounting the active device in this manner, the void between the active device and the inner connector body wall may be filled with thermo-conductive potting material such as epoxy.

Note that the locking nut and external threads may be eliminated if the adapter is press-fit into the connector body. Additionally, the adapter may be provided with exterior longitudinally running slots through which epoxy flows when the active device is potted, with the adhesive securing the adapter to the connector body.

In operation, ferrule 30 is inserted into bore 24 until shoulder 34 mates with seat 26. Because the distance "F" between the shoulder 34 and the end of the ferrule is a predetermined amount shorter than the distance "R" between seat 26 and the face of the active device mounted at the distal end of the adapter, not only is optical fiber 36 coaxially aligned with active device 50, but it is spaced from the face thereof by a predetermined amount depending on the active device used.

Figure 3:
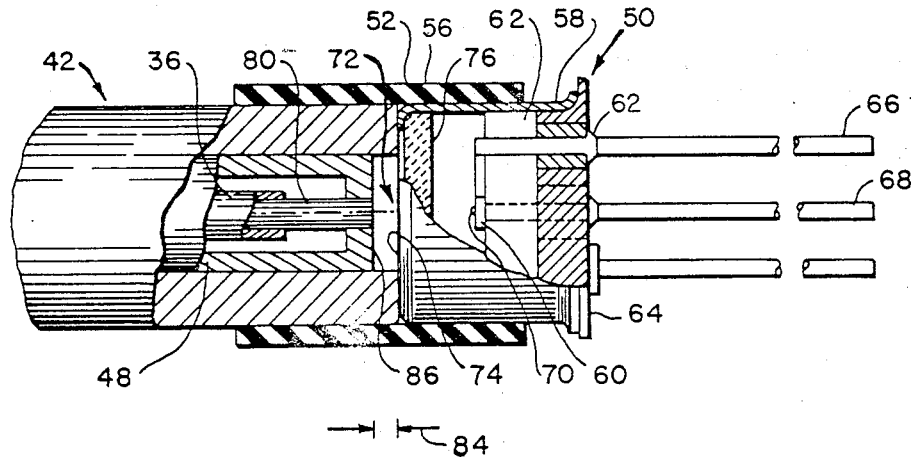
FIG. 3 is a partial cross-sectional illustration of an active device, carried at the distal end of the adapter, illustrating the utilization of a resilient alignment bushing.

Referring to FIG. 3, resilient bushing 52 surrounds a portion of distal end 42 and also a portion 56 of a can 58 utilized to house a light emitting diode 60 supported on a substrate 62 within can 58. Substrate 62 is, in turn, supported on an end piece 64 with leads 66 and 68 being connected to light emitting diode 60 as illustrated. In one embodiment, the light emitting diode includes a lens 70 which focuses emitted light to a focal point 72 at the face 74 of active device 50 provided with a transparent window 76 as illustrated.

The insertion of necked-down portion 48 into end 42 results in the core 80 of optical fiber 36 being spaced a predetermined distance as indicated by arrows 84 from face 74 of the active device. In one embodiment, the end of core 80 is secured in a centrally apertured end 86 of ferrule 30. It should be noted that the ferrule need not have a necked-down nose, but rather can have a cylindrical configuration, with bore 24 having a diameter which matches that of the cylindrical ferrule.

The resulting composite structure is illustrated in FIG. 4 in which like-reference characters are utilized to designate like elements vis-a-vis the elements of FIGS. 1, 2 and 3. As can be seen in this figure, resilient bushing 52 allows slight differences between the outside diameter of active device 50 and the outside diameter of end 42 whereby, by virtue of the resiliency of the bushing, the coaxial alignment of the active device vis-a-vis the central axis of the adapter, is established. Having established this coaxial relationship and also having established the coaxial relationship of the fiber vis-a-vis the adapter, the coaxial relationship of the fiber to the active device is assured. Moreover by the mating of shoulder 34 with seat 26, the requisite spacing of the fiber from the active device is likewise precisely established. Additionally, it will be appreciated that the active device may have an outside diameter larger than that of the turned-down end of the adapter rather than being smaller as illustrated in FIG. 4.

In the embodiments of FIGS. 1, 2 and 4, clearance is provided between cylindrical portion 90 of ferrule 30 and the wall 92 of bore 24. Clearance is also provided between the outer dimension 94 of shoulder 34 and the wall 96 of recessed seat 26. This provides that the centering of the fiber is accomplished by the cooperation of necked-down portion 48 and the wall of necked-down portion 46 of the bore.

The adapter precisely maintains the coaxiality of the fiber-containing ferrule, whereas the coaxiality of the active device vis-a-vis the adapter, is established to an exceedingly high degree due to the utilization of the resilient bushing. Thus, the coaxiality of the fiber vis-a-vis the outer shell of the active device, is also exceedingly high.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for providing efficient optical coupling between an optical fiber contained in a ferrule and an active device comprising:
    a connector body having a hollow interior;
    a separate adapter having a central channel adapted to receive said ferrule, said adapter mounted to said connector body and having a distal end of a predetermined outside dimension;
    an active device which has an outside dimension substantially matching that of said distal end; and,
    means for mounting said active device in butting relationship to said distal end including a resilient sleeve-like bushing overlying a portion of said distal end and a portion of said active device.

2. The apparatus of claim 1 wherein said distal end lies within the interior of said connector body.

3. The apparatus of claim 1 and further including a ferrule having an annular shoulder at its distal end, said adapter having a recessed seat at its proximal end, said seat being spaced from the distal end of said adapter by a predetermined distance.

4. The apparatus of claim 3 wherein said ferrule has a reduced diameter proximal end and wherein the central adapter channel has a matching reduced diameter bore at the distal end thereof.

5. The apparatus of claim 3 wherein the distance between the end of said ferrule and said shoulder is less than the distance between said shoulder and the distal end of said adapter.

6. The apparatus of claim 1 wherein a portion of said adapter carries external threads and wherein a portion of said connector body carries matching internal threads, whereby said adapter can be screwed to said connector body.

7. The apparatus of claim 1 wherein said cylindrical distal end is made from oversized stock turned-down to said predetermined dimension.

* * * * *